United States Patent
Betremieux et al.

(10) Patent No.: US 10,465,078 B2
(45) Date of Patent: *Nov. 5, 2019

(54) AQUEOUS DISPERSION OF POLYMER MADE FROM MULTISTRUCTURED PARTICLES FOR AQUEOUS WALL COATINGS RESISTANT TO DIRT AND WET ABRASION

(71) Applicant: Arkema France, Colombes (FR)

(72) Inventors: Isabelle Betremieux, Coye la Foret (FR); Alain Boone, Verderonne (FR); Jean-Yves Loze, Saint-Victor-de-Chretienville (FR)

(73) Assignee: Arkema France, Colombes (FR)

(*) Notice: Subject to any disclaimer, the term of this patent is extended or adjusted under 35 U.S.C. 154(b) by 187 days.

This patent is subject to a terminal disclaimer.

(21) Appl. No.: 15/035,843

(22) PCT Filed: Nov. 12, 2014

(86) PCT No.: PCT/FR2014/052879
§ 371 (c)(1),
(2) Date: May 11, 2016

(87) PCT Pub. No.: WO2015/071591
PCT Pub. Date: May 21, 2015

(65) Prior Publication Data
US 2016/0280932 A1    Sep. 29, 2016

(30) Foreign Application Priority Data
Nov. 15, 2013  (FR) ..................... 13 61219

(51) Int. Cl.
| C09D 5/16 | (2006.01) |
| C08F 285/00 | (2006.01) |
| C09D 151/00 | (2006.01) |
| C09D 5/02 | (2006.01) |
| C09D 133/08 | (2006.01) |
| C09D 133/12 | (2006.01) |

(52) U.S. Cl.
CPC .......... C09D 5/1662 (2013.01); C08F 285/00 (2013.01); C09D 5/022 (2013.01); C09D 133/08 (2013.01); C09D 133/12 (2013.01); C09D 151/003 (2013.01); C08L 2207/53 (2013.01)

(58) Field of Classification Search
CPC .......................... C08F 285/00; C08L 2207/53
See application file for complete search history.

(56) References Cited

U.S. PATENT DOCUMENTS

| 5,298,559 | A | 3/1994 | Fujii et al. |
| 6,750,297 | B2 * | 6/2004 | Yeu ............... C08F 285/00 523/201 |
| 2002/0013405 | A1 | 1/2002 | Sakaguchi et al. |
| 2008/0058473 | A1 | 3/2008 | Freidzon et al. |
| 2011/0218291 | A1 | 9/2011 | Schultes et al. |
| 2016/0289489 | A1 * | 10/2016 | Betremieux ......... C08F 285/00 |

FOREIGN PATENT DOCUMENTS

| JP | 2011168770 A | 1/2011 |
| WO | WO 2011/009560 A1 | 1/2011 |

* cited by examiner

Primary Examiner — Vickey Nerangis
(74) Attorney, Agent, or Firm — Lynn B. Morreale

(57) ABSTRACT

The invention relates to an aqueous dispersion of polymer, based on structured polymer particles, said particles comprising a core polymer phase, based on a polymer P1 with Tg1 ranging from 60 to 120° C., a second polymer phase enveloping said core, based on a polymer P2 with a Tg2 ranging from −60 to 40° C. and a third outer polymer phase (or shell) based on a polymer P3, with a Tg3 ranging from Tg2−5° C. to Tg2+5° C. and having an Mn not exceeding 150 000, with the weight contents of said polymers P1, P2 and P3 being, relative to the total weight of polymer (P1+P2+P3): P1 from 5% to 60%, P2 from 40% to 85%, P3 from 5% to 25% with the sum of said weight contents being 100%.

14 Claims, No Drawings

AQUEOUS DISPERSION OF POLYMER MADE FROM MULTISTRUCTURED PARTICLES FOR AQUEOUS WALL COATINGS RESISTANT TO DIRT AND WET ABRASION

CROSS-REFERENCE TO RELATED APPLICATIONS

This application is a national stage application under 35 U.S.C. § 371 of PCT/FR2014/052879, filed Nov. 12, 2014, which claims benefit to FR patent application FR13.61219, filed Nov. 15, 2013.

The present invention relates to aqueous dispersions of polymer with multi-structured particles of specific structure and composition, for aqueous wall coatings that are resistant both to soiling and to wet abrasion.

The dispersions of the invention allow perfect formation of the film during coalescence with a homogeneous film and with high cohesion due to the controlled structure of the particles formed and their perfect reproducibility and as a result the predictability of the minimum film-forming temperature (MFT). This excellent control consequently allows controlled and reproducible performance, in particular in terms of resistance to soiling and to wet abrasion.

BACKGROUND OF THE INVENTION

Patent application WO 2011/009 560 describes stable aqueous dispersions containing core/shell two-phase structured particles with a hard core P1 with a Tg1 from 60 to 120° C. and a soft shell P2 with a Tg2 from −20 to 40° C. and an MFT from 0 to 50° C. with P1 representing from 15% to 60% out of P1+P2 for applications in aqueous coatings, which are in particular self-crosslinkable. Despite the very good capacity for film formation and the control of this process with good reproducibility of the film formation and of the performance, these dispersions require the use of monomers bearing functions that are crosslinkable in post-crosslinking, either by self-crosslinking or by adding external crosslinking agents, to achieve the performance levels demanded by the market, in particular:
  in terms of resistance to wet abrasion in highly charged interior wall paints, i.e. VPC higher than the critical VPC (VPC: volume-based pigment concentration) for which the binder must be capable of interacting strongly with the pigments and fillers, with good wetting of said pigments and fillers
  in terms of durability and water resistance in moderately charged exterior wall paints (VPC close to or less than the critical VPC) which are not self-crosslinkable, in contrast with the prior art.

Other solutions exist for applications of this type, but they make use of non-structured particles of low MFT (below 5° C.). If they are not crosslinkable, as explained above, the resistance to soiling is poor.

To overcome the drawbacks of the prior art, it is proposed, according to the present invention, to modify a structured dispersion of the prior art (WO 2011/009 560) already involving a hard core phase P1 and a soft shell phase P2 by adding a second specific phase shell P3 of controlled molecular mass and with a Tg3 ranging from Tg2−5° C. to Tg2+5° C. and preferably Tg3 being equal to Tg2±2° C., with the additional soft phase P3 of lower mass than P2 being added in addition to the soft shell P2 (enveloping P2) in a specific content.

Thus, the hard/soft/soft P1/P2/P3 solution of the present invention makes it possible readily to achieve the targeted performance qualities mentioned, i.e. high resistance to soiling and to wet abrasion, without using crosslinkable systems and without losing the performance qualities that are inherent in the starting structure (P1/P2) thus modified and having ease of implementation and perfect reproducibility of the structure of the film formation and of the performance qualities. The present invention thus seeks to develop a stable dispersion, of controlled MFT, for the formulation of aqueous coatings with good resistance to soiling and to wet abrasion.

SUMMARY OF THE INVENTION

A first subject of the present invention concerns an aqueous dispersion of polymer with multi-structured polymer particles, and in particular having three specific polymer phases (layers), P1, P2 and P3 with P1 being a hard core enveloped by a first soft shell P2, P2 being enveloped by a second soft shell P3 of lower Mn measured by size exclusion chromatography (or GPC) in THF with polystyrene calibration, not exceeding 150 000, preferably ranging from 1000 to 150 000.

The second subject of the invention relates to a specific process for preparing the said dispersion with specific steps.

Next, the invention covers a composition of aqueous dispersion of polymer which comprises at least one aqueous dispersion of polymer according to the invention.

A coating composition which comprises at least one aqueous polymer dispersion and at least one aqueous polymer dispersion composition as defined according to the invention also forms part of the invention.

The invention also covers the use of a dispersion as defined according to the invention as organic binder for aqueous coatings and, finally, a coating which results from the use of said dispersion or of said dispersion composition.

DETAILED DESCRIPTION OF THE INVENTION

Thus, the first subject of the invention relates to an aqueous dispersion of polymer based on multi-structured polymer particles (at least three different polymer phases) with said particle comprising:
  a polymer phase as core, based on a polymer P1 derived from the emulsion polymerization of a monomer composition M1, with P1 having a glass transition temperature Tg1 (calculated according to Fox) ranging from 60 to 120° C. and preferably from 60 to 100° C.,
  a second polymer phase enveloping said core, based on a polymer P2 derived from the emulsion polymerization of a monomer composition M2, with P2 having a glass transition temperature Tg2 (calculated according to Fox) ranging from −60 to 40° C. and preferably from −30 to 30° C.,
  a third outer polymer phase (or shell) enveloping said phase P2 based on a polymer P3 derived from the emulsion polymerization of a monomer composition M3, with P3 having a glass transition temperature Tg3 calculated according to Fox and ranging from Tg2−5° C. to Tg2+5° C., Tg3 preferably being equal to Tg2 (±2° C.) and a number-average molecular mass Mn not exceeding 150 000, preferably ranging from 1000 to 150 000, measured by size exclusion chromatography or GPC in THF, with polystyrene calibration, with the weight contents relative to the total weight of polymer P1+P2+P3 being for:

P1 from 5% to 60%, preferably from 5% to 50%
P2 from 40% to 85%, preferably from 45% to 80%
P3 from 5% to 25%, preferably from 10% to 20% and the sum of said weight contents (P1+P2+P3) being equal to 100%.

Preferably, the polymers of phases P1 and P2 have Mn values much higher than 150 000, more particularly close to or greater than 1 000 000.

More particularly, P3 is less hydrophobic than P2 and even more particularly P2 is more hydrophobic than P1.

In general, a "hydrophobic" monomer is a monomer that has little affinity for water or that is sparingly soluble in water. One method for estimating this hydrophobicity is that of measuring the partition coefficient of the substance to be evaluated, between octanol and water, with the hydrophobicity expressed as a logarithm of this partition coefficient. The hydrophobicity value logKow for a monomer is an estimation calculated from the logarithm of the partition coefficient (logP) between octanol and water, via the method of contribution of the atoms and the structural fragments of the molecule, using for this estimation the KowWin software from SRC (Syracure Research Corporation). This methodology was described by W. M. Meylan and P. H. Howard in 1995 in *Atom/fragment contribution method for estimating octanol-water partition coefficients* in Pharm. Sci. 84: 83-92. The partition coefficient P corresponds to the ratio of the chemical concentration in the octanol phase relative to the chemical concentration in the aqueous phase in a system with two phases in equilibrium. As regards a copolymer, in particular such as a polymer defined according to the invention, the overall hydrophobicity value according to the invention based on the logarithm of the octanol/water partition coefficient is defined as being the mean weight value relative to all of the component monomers of said polymer and it is in particular estimated by the mean weight relative to all of the component monomers, from the individual logKow values calculated via the KowWin method, as described above, and thus corresponds, according to this definition, to:

overall hydrophobicity value: $\Sigma_i[x_i*(\log Kow)_i]$ with $\Sigma_i$: sum of i component monomers $x_i$: weight fraction of the monomer i in said copolymer, $(\log Kow)_i$: hydrophobicity value calculated by the KowWin method for said monomer i, with Kow corresponding to the calculated octanol/water partition coefficient and logKow being the logarithm of this coefficient.

The dispersion of the invention is in particular obtained by emulsion polymerization of said composition M1, performed in the presence of three anionic surfactants, at least two of which are different, more particularly with the presence of an anionic surfactant in a seed monomer composition M0 and of two surfactants in the monomer composition M'1, with the overall composition derived from M0 and M'1 corresponding to said monomer composition M1 and said emulsion polymerization of said composition M2 is performed in the presence of at least two surfactants including a nonionic surfactant, preferably chosen from alkoxylated fatty alcohols, and the other being anionic and possibly being identical or different relative to one of the two surfactants defined above for M1, more particularly identical to or different from that of the seed composition M0.

As anionic surfactants that are suitable for use in M0, M'1 and M2, mention may be made of surfactants bearing a sulfate, sulfonate, phosphate, phosphonate or phosphinate group, in particular from the following:

$C_8$-$C_{18}$ alkyl sulfosuccinates, which are optionally alkoxylated (diesters of sulfosuccinic acid with $C_8$-$C_{18}$ alcohols, which are optionally alkoxylated)

$C_8$-$C_{18}$, preferably $C_9$-$C_{14}$ alkyl sulfate, sulfonate, phosphate, phosphonate or phosphinate, which are optionally alkoxylated $C_8$ to $C_{18}$ alkylaryl sulfate, sulfonate, phosphate, phosphonate or phosphinate (alkyl substituted aryl), which is optionally alkoxylated.

When said alkyls are alkoxylated, the alkoxy unit may be ethoxy and/or propoxy, ethoxy being the most preferred alkoxy unit. The number of alkoxy units may range from 2 to 30 and preferably from 2 to 10.

More particularly, said anionic surfactant is selected from dodecylbenzene sulfonate, sodium lauryl sulfate, ethoxylated sodium lauryl sulfate, ethoxylated sodium isotridecyl sulfate, ethoxylated ammonium lauryl phosphate or sulfosuccinates and more preferentially from sulfosuccinates. Preferably, at least one of said anionic surfactants in M1 and M2 bears at least one sulfosuccinate group (or is a sulfosuccinate).

According to a particularly preferred option of the dispersion of the invention, said composition M2 and consequently said polymer P2 derived from M2 comprises at least one water-soluble transfer agent. Even more particularly, said composition M3 and consequently said polymer P3 derived from M3 comprises at least two transfer agents including a water-soluble transfer agent, i.e. an agent that is soluble in water, and a liposoluble transfer agent, i.e. an agent that is soluble in organic phase, i.e. in the monomer composition M3. Even more preferentially in such a case, the weight ratio of water-soluble transfer agent to liposoluble transfer agent for all the phases P2 and P3 (P2+P3) is less than 10 and preferably less than 5. Preferably, said transfer agents are chosen from mercaptans.

As suitable water-soluble transfer agents, mention may be made of transfer agents comprising an ionic or ionizable group with a small number of carbon atoms, for example at least 4 carbon atoms.

As suitable liposoluble transfer agents, mention may be made of transfer agents comprising a large number of carbon atoms, for example at least 6 carbon atoms. As ionic or ionizable groups, mention may be made of —$CO_2H$ or $SO_3H$ groups or salts thereof.

According to a particular option of the present invention, said composition M3 from which P3 is derived and optionally said composition M2 from which P2 is derived comprise at least one ethylenically unsaturated monomer bearing, in addition to its ethylenic unsaturation, at least one functional group X selected from: acetoacetoxy, alkoxysilane, carboxy/anhydride, hydroxy, amine, epoxy (or oxirane), phosphate, phosphonate, phosphinate, sulfate, sulfonate, amide, imidazole, cyclic carbonate, ureido, these functional groups not constituting sites of crosslinking but providing, for example, an improved capacity for formulation, affinity for pigments or fillers and improved adhesion to difficult substrates. More preferentially, said functional groups X are selected from: acetoacetoxy, carboxy/anhydride, hydroxy, amine, epoxy (or oxirane), phosphate, phosphonate, phosphinate, sulfate, sulfonate, amide, imidazole, cyclic carbonate or ureido.

Depending on the group X, said monomer bearing a group X may be chosen as follows per group X:

for carboxy/anhydride: (meth)acrylic acid, itaconic acid/anhydride, fumaric acid, maleic anhydride, tetrahydrophthalic (THP) acid/anhydride for hydroxy: hydroxyalkyl (meth)acrylates, with $C_2$ to $C_4$ alkyl, which are optionally alkoxylated, in particular alkoxylated or non-alkoxylated hydroxyethyl (meth) acrylate (HE(M)A), hydroxypropyl (meth)acrylate (HP(M)A), hydroxybutyl (meth)acrylate HB(M)A for epoxy: GLY(M)A glycidyl (meth)acrylate, (meth) acrylate bearing an epoxidized cycloaliphatic group from among epoxidized dicyclopentenyl, epoxidized cyclohexenyl, epoxidized tetrahydrophthalic and epoxidized norbornenyl for amine: aminoalkyl (meth)acrylates or aminoalkyl (meth)acrylamides with $C_2$ to $C_4$ alkyl, for example DMAEMA (dimethyl aminoethyl methacrylate) or TBAEMA (t-butylaminoethyl methacrylate)

for amide: (meth)acrylamide for cyclic carbonate: glyceryl (meth)acrylate carbonate for phosphate: optionally alkoxylated phosphate mono- and/or diesters of hydroxyalkyl (meth)acrylates for phosphonate: optionally alkoxylated phosphonate esters of hydroxyalkyl (meth)acrylates for phosphinate: optionally alkoxylated esters of hydroxyalkyl (meth)acrylates with phosphinic acid for sulfate: hydroxyalkyl (meth)acrylate esters, optionally with alkoxylated alkyl for sulfonate: optionally alkoxylated esters of hydroxyalkyl (meth)acrylates or of hydroxyalkyl(meth)acrylamides, with sulfonic acid, sulfonates such as hydroxyethyl (meth)acrylate sulfonate or acrylamide propane sulfonate (in ester, acid or salt form) for ureido: 2-ethyl-(2-oxoimidazolidin-1-yl) methacrylate for acetoacetoxy: acetoacetoxyethyl (meth)acrylate (AAEM) for alkoxysilane: alkoxysilane (meth)acrylates.

When a monomer bearing a group X is present, the index of groups X expressed in mmol/g of polymer (the polymer being here: P1+P2+P3) may range from 0.002 to 0.5, preferably 0.005 to 0.5, more preferentially from 0.01 to 0.5 and even more preferentially from 0.02 to 0.5.

According to a preferred possibility, said polymers P1, P2 and P3 are derived, respectively, from said monomer compositions M1, M2 and M3, constituted exclusively of (meth) acrylic monomers or of mixtures of (meth)acrylic monomers with at least one vinyl aromatic monomer, styrene being the preferred vinyl aromatic monomer.

According to another particular possibility, said polymer P1 is derived from a monomer composition M1 comprising at least one monomer as internal crosslinking agent. This means that said crosslinking agent bears at least two ethylenic unsaturations that are polymerizable during the emulsion polymerization of said composition M1 to give a crosslinked polymer P1. As examples of suitable crosslinking agents, mention may be made of multifunctional monomers with a functionality of acrylic, allylic or vinyl groups of at least 2. As suitable examples of acrylic crosslinking agents, mention may be made of ethylene glycol di(meth) acrylate, propylene glycol di(meth)acrylate, butanediol di(meth)acrylate, hexanediol di(meth)acrylate or trimethylolpropane tri(meth)acrylate. The term "acrylics" means herein both acrylics and methacrylics, and the term "acrylates" means both acrylates and methacrylates. Two different groups may also be present in a mixed agent. An example of a mixed crosslinking agent that may be mentioned is allyl methacrylate. As suitable vinyl internal crosslinking agent, mention may be made of a vinyl monomer bearing at least two vinyl unsaturations, for instance di- and tri-vinyl benzenes.

The second subject of the invention relates to a process for preparing a dispersion as defined above according to one of the variants of the invention, which process comprises the following emulsion polymerization steps:

i) a seeding step comprising an emulsion prepolymerization of a seed monomer composition M0, with the seed particles having a size of less than or equal to 30 nm and representing a weight content ranging from 2% to 25% and preferably from 5% to 20% of the weight of said polymer phase P1

(ii) a step of emulsion polymerization of a monomer composition M'1 giving a polymer P'1, thus constituting with the seed polymer P0 obtained in step i) said polymer phase P1 of said particle core, said monomer composition M'1 being identical to or different from said seed composition M0 (and if identical to M0, it corresponds to that of said monomers M1) and their overall weight-average composition (M0+M'1) corresponding to that of said monomers M1, the product of this step ii) (dispersion) optionally being able to be stored and used at a later time, as starting material for the following step iii), i.e. for the addition and polymerization of said monomer composition M2 iii) a step of emulsion polymerization of a monomer composition M2 giving rise to said polymer phase P2, said step iii) comprising at the start a seeding, optionally in the presence of a water-soluble transfer agent iv) a step of emulsion polymerization of a monomer composition M3 giving rise to said polymer phase P3, optionally in the presence of two transfer agents, one water-soluble and the other liposoluble, preferably chosen from mercaptans, so as to obtain said polymer P3 as an outer layer.

The overall weight-average composition of the mixture M0+M'1 corresponds to the composition of said monomers M1 from which said polymer phase P1 is derived.

Optionally, the product of this step ii) (dispersion) may be stored and used at a later time, as starting material for the following step iii), i.e. for the addition and polymerization of said monomer composition M2.

According to a first variant of said process:

the seeding step i) is performed in the presence of from 0.01% to 0.5% and preferably from 0.05% to 0.2% by weight of an anionic surfactant (the surfactant product being considered in dry form, i.e. at 100% of surfactant) relative to the total weight of P1+P2+P3 the step of emulsion polymerization ii) of the monomer composition is performed in the presence of from 0.1% to 3% and preferably from 0.1% to 1.5% by weight, relative to the total weight of P1+P2+P3, of a first anionic surfactant which is identical to or different from that of the seed M0, i.e. the one used in the seeding step i), but, if it is identical, this means that it is added to said step ii), and of a second anionic surfactant different from the first of this step ii), with the weight content of these two anionic surfactants of phase P1 being from 0.1% to 3% and preferably from 0.1% to 1.5% relative to the total weight of P1+P2+P3 the step of emulsion polymerization iii) of the monomer composition M2 is performed in the presence of from 0.1% to 3% and preferably from 0.2% to 2.5% by weight, relative to the total weight of P1+P2+P3, of at least two surfactants a) and b) with a) being a first nonionic surfactant chosen from alkoxylated fatty alcohols, more preferentially alkoxylated $C_{12}$ to $C_{16}$ fatty alcohols, even more preferentially with ethoxy and/or propoxy as alkoxy units, in particular ethoxy units and more particularly with the number of said alkoxy units being from 3 to 50 and even more particularly from 5 to 40 ethoxy units and b) being an anionic surfactant which may be identical to or different from those of step ii), with said step iii) comprising at the start a seeding, and optionally in the presence of at least one water-soluble transfer agent the step of polymerization iv) of said composition M3 is performed in the presence or absence of surfactants and if performed in the presence of surfactants, under the same conditions as those of step iii) and optionally in the presence of at least two transfer agents, of which one is water-soluble and one is liposoluble.

More particularly, regarding said process according to the invention:

steps i) and ii) are performed at a temperature of from 75 to 90° C.

the step of polymerization iii) of said monomer composition M2, like the step of polymerization iv) of said monomer composition M3, is performed at a temperature below Tg1, when said process is performed at atmospheric pressure.

More preferentially, regarding said process, step ii) of emulsion polymerization of the overall monomer composition M1, giving said polymer P1, and step iii) of emulsion polymerization of said monomer composition M2 giving said polymer P2 are continued to a degree of conversion of at least 95%, more preferentially at least 98% and even more preferentially 100% before the addition of said monomer composition M3.

The third subject of the invention relates to an aqueous polymer dispersion composition, which composition comprises at least one aqueous dispersion as defined according to any of the variants defined above according to the invention or obtained via the process as defined according to the invention.

According to a particular and preferred case in said dispersion composition, said dispersion is a dispersion as defined above comprising in P3, and optionally in P2, functionalized monomers X.

According to a particularly preferred variant, said aqueous polymer dispersion composition comprises, in addition to said dispersion according to the invention, at least one other aqueous polymer dispersion, preferably with said other dispersion being a dispersion of resins or of polymers chosen from: dispersion of saturated and/or unsaturated polyesters, preferably based on unsaturated polyesters and more preferentially dispersion of modified or unmodified alkyd resins, dispersion (emulsion) of acrylic copolymers, including purely acrylic and styrene-acrylic copolymers, dispersion of vinyl copolymers, dispersion of acryl acrylic oligomers, dispersion of polyurethanes including unsaturated polyurethanes, in particular acryl polyurethanes, dispersion of hydrocarbon resins or dispersion of colophony resins, including colophony esters or dispersion of colophony-modified resins.

Among the alkyd dispersions are included dispersions of modified alkyds, in particular modified with acrylic monomers or with vinyl aromatic monomers such as styrene or with urethane units or with amide units or modified with colophony and in particular short in oil, More particularly, said alkyd is biosourced relative to the starting materials used. Such a biosourced resin is described in particular in WO 2012/042153.

Said aqueous dispersion composition of the invention may be prepared by mixing said dispersions performed at the temperature of synthesis of the aqueous dispersion according to the invention or at a lower temperature.

According to another option, said polymer dispersion composition comprises a dispersion according to the invention as defined above with P3 and optionally P2 derived from respective monomer compositions, comprising for P3, and optionally for P2, monomers functionalized with X from among acetoacetoxy, alkoxysilane, carboxy/anhydride, hydroxy, amine, epoxy (or oxirane), phosphate, phosphonate, phosphinate, sulfate, sulfonate, amide, imidazole, cyclic carbonate, and preferably from among acetoacetoxy, carboxy/anhydride, hydroxy, amine, epoxy (or oxirane), phosphate, phosphonate, phosphinate, sulfate, sulfonate, amide, imidazole, cyclic carbonate.

Another subject of the invention relates to a coating composition, in particular an aqueous coating composition, which composition comprises at least one aqueous dispersion as defined according to the invention as described above or obtained via a process as defined according to the invention or said coating composition comprises at least one dispersion composition as defined above according to the invention.

More particularly, said coating composition does not comprise any coalescer. This means that there is no need for such an agent for coalescence and film formation, given the specific structure of the particle associated with the specific preparation process used.

Another subject covered by the present invention is the use of an aqueous dispersion according to the invention or obtained via a process according to the invention, as an organic binder for aqueous coatings, i.e. in aqueous coating compositions.

More particularly, this use may concern aqueous coatings.

Said use preferably concerns industrial coatings, in particular protective coatings and/or decorative coatings, more particularly chosen from: paints, varnishes, lacquers, primers, inks, adhesives and/or top coats, and coatings for leakproofing, for treating glass, for treating fibers, in particular textile, or for treating woven or nonwoven fabrics.

According to a particular option, said use concerns protective coatings chosen from coatings for mechanical and/or chemical protection of substrates, in particular from the following substrates: metal, concrete, fiber cement, plaster, wood, cardboard, plastic, composite, glass, fibers (hollow or filled), textile, woven or nonwoven fabrics (which may be synthetic or cellulose-based fabrics), and leather.

More particularly and preferably, said polymer dispersion is used for aqueous coatings, which are resistant to soiling and/or to wet abrasion.

Finally, the invention also covers a coating, in particular a non-crosslinked coating as finished product, resulting from the use of at least one dispersion as described above according to the invention or obtained via a process of the invention as described above or from the use of a dispersion composition as described above according to the invention. More particularly, said coating is not crosslinked.

The examples outlined below are presented as illustrations of the invention and of its performance qualities and do not in any way limit the invention.

A) Description of the Starting Materials, the Preparation of the Dispersion

1) Starting Materials for Preparing the Dispersions (see Table 1 Below)

TABLE 1

Starting materials used in the synthesis of the dispersions

| Constituents | Functions | Chemical natures | Suppliers |
|---|---|---|---|
| Aerosol® A102 | Surfactant | Ethoxylated fatty alcohol sulfosuccinate, sodium salt ($C_{10}$-$C_{12}$) solution at 30% in water | Cytec |
| Disponil® FES 32 | Surfactant | Fatty alcohol sulfate polyglycol ether, sodium salt solution at 31% in water | Cognis |
| Emulan® TO 4070 | Surfactant | Secondary ethoxylated fatty alcohol with 40 EO, 70% | BASF |
| SR 238 | Crosslinking agent | Hexanediol diacrylate | Sartomer |
| BuA | Monomer | Butyl acrylate | Arkema |
| MMA | Monomer | Methyl methacrylate | Arkema |
| AA | Monomer | Acrylic acid | Arkema |
| MAA | Monomer | Methacrylic acid | Arkema |
| nDDM | Mercaptan | N-Dodecyl mercaptan | Acros |
| MAA | Mercaptan | Mercaptoacetic acid | Acros |
| $Na_2S_2O_8$ | Peroxide | Sodium persulfate | Aldrich |
| TBHP | Peroxide | 70% tert-Butyl hydroperoxide | Aldrich |
| SFS | Reducing agent | Sodium formaldehyde sulfoxylate | Bruggeman |
| $NH_3$ | Neutralization | Ammonium hydroxide | Prolabo |
| Acticide MBS | Biocide | Aqueous solution of methylisothiazoline (MIT) and of benzisothiazolinone (BIT) (2.5% MIT/2.5% BIT) | Thor |

The Tg values of the phases P1, P2 and P3 are calculated according to Fox's law from the Tg values of the homopolymers, as indicated below:

| Monomer | Abbreviation | Tg (° C.) |
|---|---|---|
| Acrylic acid | AA | 106 |
| Methacrylic acid | MAA | 228 |
| Butyl acrylate | BuA | −54 |
| Methyl methacrylate | MMA | 105 |

In the case of the test described below according to the invention, the calculated Tg values, the weight percentages and the Mn values of the various phases are indicated in Table 2 below:

TABLE 2

Calculated Tg values, weight percentages and Mn values of the Phases P1, P2 and P3

|  | P1 | P2 | P3 |
|---|---|---|---|
| Fox Tg in ° C. | 63 | −8 | −6 |
| weight % vs (P1 + P2 + P3) | 40.0 | 47.8 | 12.2 |
| Mn | ≥1 × 10$^6$ | ≥1 × 10$^6$ | 1 × 10$^3$-1.5 × 10$^5$ |

2) Procedure for Preparing Dispersions Studied Here

The procedure presented below concerns the synthesis of the dispersion of the example described according to the invention.

2.1) Equipment Used

A 10 L steel reactor (internal capacity) is used, equipped with a jacket, an efficient stirrer (vortex), a three-flow condenser, a control and a regulator of the material temperature. The reactor comprises the number of the introduction connections necessary for separate introduction of the various components and also an introduction dedicated to inertizing the system with nitrogen. The leaktightness is checked before each synthesis. The installation is equipped with a system for controlling the introduction rates of the components. The polymerization is of semi-batch type at atmospheric pressure.

2.2) Preparation of the Initial Charge as Feedstock 120 g of Disponil® FES 32 are dissolved in 3116 g of demineralized water as feedstock. The temperature of the feedstock is brought to 80° C.

2.3) Preparation of the Seed M0 for P0

113.4 g of MMA and 25.2 g of BuA are mixed.

2.4) Preparation of the Pre-Emulsion M'1 for P'1

40 g of Aerosol® A102 and 66.67 g of Disponil® FES 32 are dispersed in 325.33 g of demineralized water with good stirring.

The following are added in turn and with good stirring:
1146.6 g of MMA
254.8 g of BuA
40 g of HDDA
20 g of MAA The pre-emulsion M'1 thus formed is white and stable and is maintained under gentle stirring.

M'1 is used for the synthesis of the core of particle P1, composed of P0 and P'1 (P1=P0+P'1).

2.5) Preparation of the Pre-Emulsion M2 for P2

31.87 g of Aerosol® A102 and 59.75 g of Emulan® TO 4070 are dispersed in 371.7 g of water with good stirring.

The following are added in turn and with stirring:
669.2 g of MMA
1147.2 g of BuA A stable white pre-emulsion is obtained.

6.32% of this pre-emulsion, i.e. 144 g, are taken up and used to perform seeding before adding the remainder for P2.

The following are then added to the pre-emulsion, still with good stirring:
87.64 g of MAA
6 g of MAA
54 g of rinsing water This stable white pre-emulsion is used for synthesizing the first shell of the particle P2.

2.6) Preparation of the Pre-Emulsion M3 for P3

8.13 g of Aerosol® A102 and 15.25 g of Emulan® TO 4070 are dispersed in 113.26 g of water with good stirring.

The following are added in turn and with stirring:
170.80 g of MMA
292.80 g of BuA
22.36 g of MAA
10 g of AA
2 g of MAA
18 g of rinsing water
0.8 g of nDDM This stable white pre-emulsion is used for synthesizing the second shell of the particle P3.

2.7) Polymerization Process i) Seeding P0

Since the feedstock with the initial charge is stable at 80° C., the mixture of 113.4 g of MMA and 25.2 g of BuA are introduced for the seeding P0.

Once the temperature has stabilized, 100% of the sodium persulfate solution are added, i.e. 14 g dissolved in 266 g of water. The exothermicity maximum marks the end of this step; the particle size is about 30 nm and the conversion is greater than 70%.

ii) Synthesis of the Core P1

The introduction of the pre-emulsion P'1 lasts 120 minutes at a polymerization temperature of 80° C.

The temperature is maintained for a further 60 minutes at 80° C. At the end of this thermal curing, the reaction medium is cooled to 65° C. The conversion is then close to 100%.

iii) Synthesis of the Shell P2

At 65° C., the seeding constituted by 144 g of the fraction of M2 (as described in point 2.5)) is introduced into the reactor. Mixing is performed for at least 5 minutes.

Start of the separate introductions:
All (the remainder) of the pre-emulsion M2 (without the seeding already added)
100% of a TBHP solution, i.e. 4.28 g in 18.8 g of water
100% of an SFS solution, i.e. 3 g in 72 g of water During the additions, which last 120 minutes, the temperature of the medium is maintained at 65° C. This step is followed by post-curing which lasts 10 minutes at 65° C. The conversion is then close to 100%.

iv) Synthesis of the Shell P3

At 65° C., the following are introduced:
100% of the pre-emulsion P3 over 30 minutes
100% of a TBHP solution, i.e. 1.43 g in 6.3 g of water, over 45 minutes
100% of an SFS solution, i.e. 1 g in 24 g of water, over 45 minutes This step is followed by post-curing which lasts 30 minutes at 65° C. The conversion is then close to 100%.

v) Final Additions

After cooling to 30-35° C., the dispersion is first neutralized with good stirring (vortex) by adding 28% aqueous ammonia solution, about 4.5 g per kg of latex, added over about 30 minutes. The pH is between 8 and 9.

After stirring for 60 minutes, a biocidal system is added. The dispersion is then filtered through a 100 μm gauze and characterized in that:
the pH is 8
the dry extract is 46%
the viscosity is 70 mPa·s
the final particle size is about 85 nm
the measured MFT is 9° C.

3) Methods and Tests Used a) pH

The pH of the aqueous dispersions is measured according to standard ISO 976.

b) Dry Extract

The dry extract of the aqueous dispersions is measured according to standard ISO 3251.

c) Viscosity

The viscosity of the aqueous dispersions is measured according to standard ISO 2555.

d) Particle Size

The particle size is measured by photon correlation spectroscopy (PCS), using an N4+ machine from Beckman Coulter. The sample is diluted (3 to 5 drops of emulsion in 50 ml of water) in a polystyrene tank using deionized water on a 0.22 μm cellulose acetate filter. The particle size is measured at a temperature of 25° C., at a measuring angle of 90° and at a laser wavelength of 633 nm.

e) Minimum Film-Forming Temperature (MFT)

The MFT of the aqueous dispersions is measured according to standard ISO 2115.

The invention claimed is:

1. An aqueous dispersion of polymer based on multi-structured polymer particles having at least 3 different polymer phases wherein said particle comprises:
   a polymer phase as core, based on a polymer P1 derived from the emulsion polymerization of a monomer composition M1, with P1 having a glass transition temperature Tg1 calculated according to Fox from 60 to 120° C.,
   a second polymer phase enveloping said core, based on a polymer P2 derived from the emulsion polymerization of a monomer composition M2, with P2 having a glass transition temperature Tg2, calculated according to Fox, from −60 to 40° C.,
   a third outer polymer phase as shell enveloping said second polymer phase, based on a polymer P3 derived from the emulsion polymerization of a monomer composition M3, with P3 having a glass transition temperature Tg3, calculated according to Fox, from Tg2−2° C. to Tg2+2° C., and a number-average molecular mass Mn, measured by size exclusion chromatography with polystyrene calibration, not exceeding 150,000,
with the weight contents relative to the total weight of polymer P1+P2+P3 being for:
   P1 from 5% to 60%,
   P2 from 40% to 85%,
   P3 from 5% to 25%,
the sum of said weight contents (P1+P2+P3) being equal to 100%,
wherein said at least 3 different polymer phases are formed sequentially starting with the core and ending with the shell, and wherein said composition M3 from which P3 is derived and optionally said composition M2 from which P2 is derived have at least one ethylenically unsaturated monomer bearing, in addition to its ethylenic unsaturation, at least one functional group X selected from the group consisting of: acetoacetoxy, alkoxysilane, carboxy/anhydride, hydroxy, amine, epoxy (or oxirane), phosphate, phosphonate, phosphinate, sulfate, sulfonate, amide, imidazole, cyclic carbonate, and ureido, and wherein
polymers P1, P2 and P3 are derived, respectively, from said monomer compositions M1, M2 and M3, consisting of (meth)acrylic monomers or of mixtures of (meth)acrylic monomers with at least one vinyl aromatic monomer.

2. The aqueous dispersion of claim 1, wherein said emulsion polymerization of said composition M1 is performed in the presence of three anionic surfactants, including one anionic surfactant which is present during the emulsion polymerization of a seed monomer composition M0 and two different anionic surfactants which are present during the emulsion polymerization of a monomer composition M'1 with the overall composition derived from M0 and M'1 corresponding to said monomer composition M1 and in that said emulsion polymerization of said composition M2 is performed in the presence of at least two surfactants, one of which is nonionic, chosen from the group consisting of alkoxylated fatty alcohols, and the other being anionic and optionally being identical or different relative to one of the two surfactants present during the emulsion polymerization of M1.

3. The dispersion as claimed in claim 2, wherein at least one of said anionic surfactants present during the emulsion polymerization of M1 and M2 bears at least one sulfosuccinate group.

4. The dispersion as claimed in claim 1 wherein said emulsion polymerization of said composition M2 is performed in the presence of at least one water-soluble transfer agent and said polymer P2 derived from M2 comprises at least one water-soluble transfer agent.

5. The dispersion as claimed in claim 1 wherein said emulsion polymerization of said composition M3 is performed in the presence of at least two transfer agents, of which one is water-soluble and one is liposoluble and said polymer P3 derived from M3 comprises at least two transfer agents, of which one is water-soluble and one is liposoluble.

6. The dispersion as claimed in claim 5, wherein the weight ratio of water-soluble transfer agent to liposoluble transfer agent for P2 and P3 (P2+P3) is less than 10.

7. The dispersion as claimed in claim 6 wherein an index of groups X expressed in mmol/g of polymer (polymer: P1+P2+P3) ranges from 0.002 to 0.5.

8. The dispersion as claimed in claim 1 wherein said polymer P1 is derived from a monomer composition M1 comprising at least one monomer as internal crosslinking agent.

9. An aqueous polymer dispersion composition comprising at least one aqueous dispersion as defined according to claim 1, and in addition to said dispersion, at least one other aqueous polymer dispersion of resins or of polymers chosen from the group consisting of: dispersion of saturated and/or unsaturated polyesters, dispersion (emulsion) of acrylic copolymers, including acrylic and styrene-acrylic copolymers, dispersion of vinyl copolymers, dispersion of acryl acrylic oligomers, dispersion of polyurethanes including unsaturated and saturated polyurethanes, dispersion of hydrocarbon resins or dispersion of colophony resins including colophony esters or dispersion of colophony-modified resins.

10. The composition as claimed in claim 9 which does not comprise any coalescer.

11. A coating composition comprising at least one aqueous dispersion as defined according to claim 1.

12. A process for preparing a dispersion according to claim 1, said process comprising emulsion polymerization steps:
  i) seeding via emulsion polymerization of a seed monomer composition M0, with the seed particles having a size of less than or equal to 30 nm and representing a weight content ranging from 2% to 25% of the weight of said polymer P1,
  ii) emulsion polymerizing a monomer composition M'1 giving a polymer P'1, thus constituting with seed polymer P0 obtained in step i) said polymer P1 of said particle core, said monomer composition M'1 being identical to or different from said seed composition M0 and their overall weight-average composition (M0+M'1) corresponding to that of said monomers M1, the product of this step ii) (dispersion) optionally being able to be stored and used at a later time, as starting material for the following step iii),
  iii) emulsion polymerizing monomer composition M2 resulting in said polymer P2, said step iii) comprising at the start a seed and optionally in the presence of a water-soluble transfer agent,
  iv) polymerizing a monomer composition M3 resulting in said polymer P3, so as to produce said polymer P3 as an outer layer, optionally in the presence of two transfer agents chosen from the group consisting of mercaptans, one being water-soluble and the other liposoluble.

13. The process as claimed in claim 12 wherein:
steps i) and ii) are performed at a temperature of from 75 to 90° C.
the step of polymerization iii) of said monomer composition M2, and the step of polymerization iv) of said monomer composition M3, is performed at a temperature below Tg1, when said process is performed at atmospheric pressure.

14. The process as claimed in claim 12 wherein step ii) of emulsion polymerization of the overall composition M1, resulting in polymer P1, and step iii) of emulsion polymerization of said composition M2, resulting in polymer P2, are continued to a degree of conversion of at least 95%, before addition of said monomer composition M3.

* * * * *